United States Patent [19]
Kucera

[11] 3,815,344
[45] June 11, 1974

[54] MACHINE FOR FORMING LARGE ROUND BALES OF A FIBROUS MATERIAL

[75] Inventor: Joseph B. Kucera, Traer, Iowa

[73] Assignee: Rudolph L. Lowell, Des Moines, Iowa ; a part interest

[22] Filed: Nov. 29, 1972

[21] Appl. No.: 310,417

[52] U.S. Cl. .................................... 56/341, 56/1
[51] Int. Cl. ............................................ A01d 75/00
[58] Field of Search ............... 56/1, 16, 4, 341–343, 56/15.9

[56] References Cited
UNITED STATES PATENTS
| | | | |
|---|---|---|---|
| 3,057,139 | 10/1962 | Lane et al. | 56/8 |
| 3,110,145 | 11/1963 | Avery | 56/1 |
| 3,587,218 | 6/1971 | Geary | 56/343 |
| 3,650,100 | 3/1972 | Swan | 56/341 |
| 3,665,690 | 5/1972 | Wenger | 56/341 |
| 3,680,296 | 8/1972 | Beebout | 56/16.4 |

Primary Examiner—Russell R. Kinsey
Attorney, Agent, or Firm—Rudolph L. Lowell

[57] ABSTRACT

A rotatable combination material lifting and rolling unit of the machine is advanced along a windrow of fibrous material to lift and roll the material on the ground surface to form a bale. The bale being formed is compacted by means including compacting members spaced transversely of and located forwardly of the combination unit to yieldably engage upper peripheral portions of the bale during the entire bale forming operation. On completion of a baling operation the formed bale may be left in the field for later transport to a feeding or storage station.

16 Claims, 20 Drawing Figures

MACHINE FOR FORMING LARGE ROUND BALES OF A FIBROUS MATERIAL

SUMMARY OF THE INVENTION

The machine is of a simple construction, economical in cost and efficient in operation to form large round bales of hay having a weight of about a half ton or more. In operation the machine is readily adapted to be either pulled or pushed by a usual farm tractor. The combination material lifting and rolling unit has a relatively large diameter of about two feet and is rotated at a peripheral speed that is about the same as the linear speed of travel of the tractor. The combination unit functions not only to gather and lift the windrowed material for rolling into a bale, but also positively engages the bale so as to assist in rolling the bale along the ground surface as it is being formed. After the core of the bale has been partially formed its upper peripheral portion is yieldably engaged by material compactors which function to continuously compress the bale during the bale forming operation. The completed bale is readily removed from the machine by merely driving the machine out of the windrow, and then backing the machine away from the bale. A new baling operation is then started in the windrow at the place of completion of the previous bale forming operation.

BACKGROUND OF THE INVENTION

Machines for forming large round bales are known. However, these machines are generally expensive and, in most instances require that the bale be transported during forming. Where a bale is rolled on the ground surface, in a forming operation, the bulk and weight of a machine can be appreciably reduced.

An apparatus for forming a round bale by rolling the bale ahead of a material pickup device is shown in U. S. Pat. No. 3,110,145. This machine is intended to form bales of relatively small diameter and is automatically operated to discharge a completed bale when the bale reaches a diameter of a predetermined size. For this purpose a continuous belt-like rake assembly for gathering the windrowed material is arranged to travel over the upper peripheral portion of the bale to actuate an arm which releases the bale when the bale is of the predetermined diameter. By virtue of the path followed by the rake assembly and the arrangement of the pickup fingers in the assembly the windrowed material tends to be retained and carried by the rake assembly rather than rolled resulting in leaf and stem losses that appreciably reduce the efficiency and economy of the baling operation. This objection would become more aggravated if a large round bale were to be formed.

DETAIL DESCRIPTION OF THE INVENTION

Figure 1:
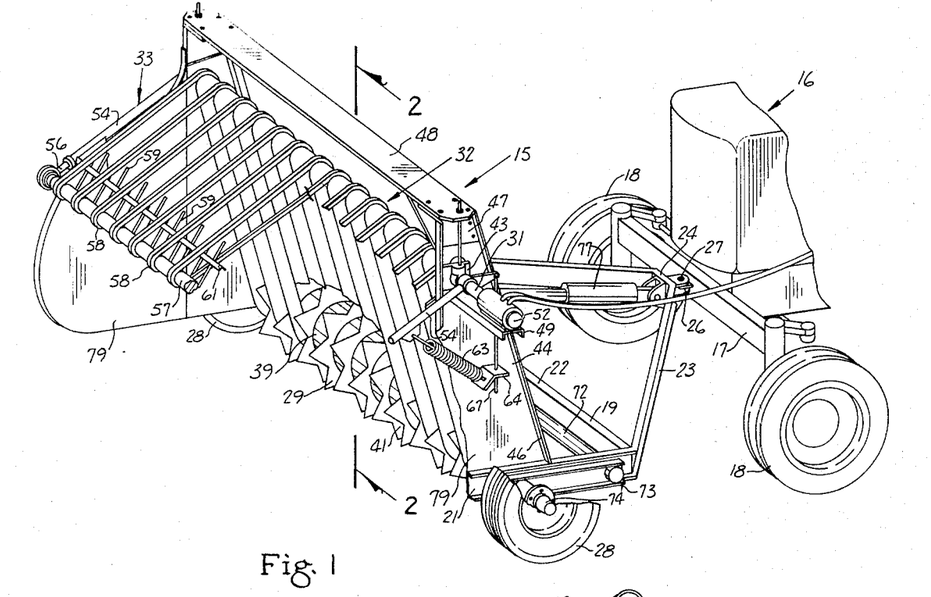
FIG. 1 is a front perspective view of a bale forming machine of this invention shown in assembly relation with the front portion of a tractor, with parts broken away to better illustrate its construction.

Referring to FIG. 1 of the drawings the round bale forming machine of this invention, designated generally as 15, is shown in assembly relation with a usual farm tractor 16 that includes a front axle 17 having steering wheels 18. The tractor is equipped with a hydraulic pump (not shown) for supplying fluid under pressure for operating various type tractor attachments. The baling machine is illustrated as of push-type and has a U-shape main frame 19 (FIGS. 1 and 6) with leg or side members 21 projected forwardly from the opposite ends of a transverse base member 22. A V-shape bumper structure 23 secured to the base member 22 has the apex section 24 thereof pivoted to a hitch 26 carried centrally on the front axle 17 and providing for a relative pivotal movement between the tractor 16 and the baling machine 15 about a vertically extended hitch pin 27. The frame 19 is supported on a pair of ground wheels 28 corresponding to the side members 21.

A rotatable combination material lifting and rolling unit 29 (FIG. 1) for gathering fibrous material, such as hay which is to be baled, is mounted on the side members 21 at a position rearwardly of the ground wheels 28 and in a driven relation with a drive shaft 31 located upwardly and forwardly from the combination unit 29. A plural belt drive unit 32 connected with the combination unit and drive shaft 31 cooperates with a belt structure 33 to form and compact a bale as it is rolled on the ground ahead of the combination unit 29.

Figure 2:
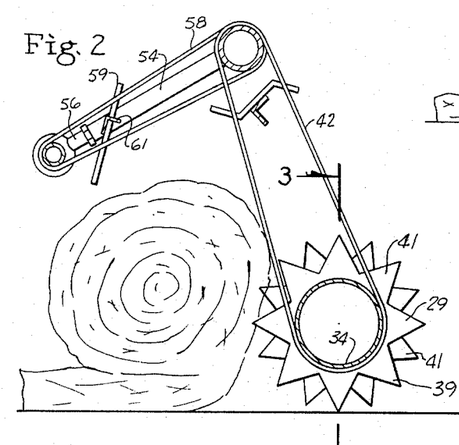
FIG. 2 is an enlarged transverse sectional view of a combination material lifting and rolling unit taken on the line 2—2 in FIG. 1 showing the assembly thereof with a bale engaging belt structure.
Figure 3:
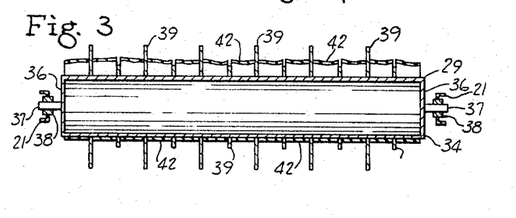
FIG. 3 is a reduced sectional view longitudinally of the combination unit as seen along the line 3—3 in FIG. 2.

The unit 29 (FIGS. 1, 2 and 3) is comprised of a tubular body member 34 of a cylindrical shape and of a length somewhat less than the transverse spacing between the frame side members 21. Each end of the body member 34 is closed by a cover plate 36 to which is secured a stub axle 37 that is rotatably supported on an adjacent side member 21 by a suitable bearing means indicated at 38. Spaced axially of the cylindrical body member 34 are a plurality of circumferentially extended rows 39 of material lift members 41. As best appears in FIG. 2, each lift member 41 is of an equilateral triangle shape, and with the lift members in a row 39 circumferentially positioned about the body member 34 in an end to end relation. In one embodiment of the invention the cylindrical body member 34 is about 8 feet long and 1 foot in diameter and each lift member 41 has an altitude of about 6 inches extended radially of the body member so that the combination unit 29 has an overall diameter of about 24 inches.

The unit 29 is driven from the drive shaft 31 by the belt unit 32 which includes a plurality of flat continuous belts 42 spaced transversely of the machine 15 having upper portions trained about the drive shaft and lower portions trained about the cylindrical body member 34 between adjacent rows 39 of the lift members 41.

Figures 4, 5:
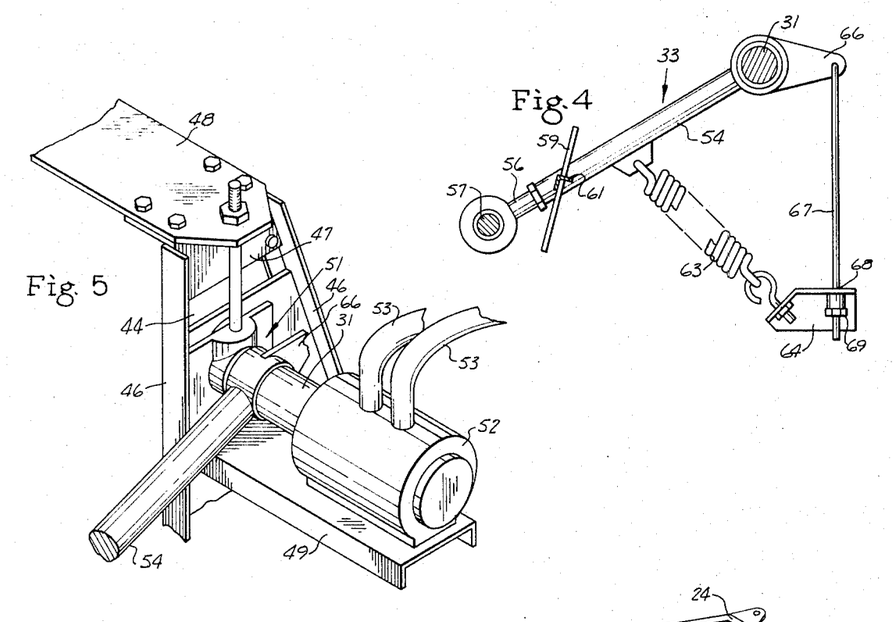
FIG. 4 is an enlarged detail view of a tensioning mechanism shown generally in FIG. 1 for one of the belt structures shown in FIG. 2.
FIG. 5 is a detail perspective view of a motor assembly for operating the combination unit.

The drive shaft 31 (FIG. 1) has its opposite ends rotatably carried in bearing units 43 supported adjacent to the upper ends of upright side frames 44 which are secured transversely opposite each other to corresponding ones of the frame side members 21. Each side frame 44 includes a pair of upwardly extended legs 46 of an angle iron construction having converging upper ends connected together by brace plates or brackets 47. Extended between and connected to the brace plates 47 is a transverse connecting member 48. A shelf or platform 49 (FIG. 5) projected laterally outwardly from one of the side frames 44, at a position adjacent one end 51 of the drive shaft, supports a hydraulic motor 52 for rotating the drive shaft. The motor 52 is operatively associated with the hydraulic pressure system of the tractor 16 through hose connections 53.

Projected forwardly from each end of the drive shaft 31 (FIG. 1) is a supporting arm 54 which forms part of the belt structure 33. Each arm 54 is provided with a longitudinally extensible front end extension 56, the forward ends of which rotatably support a roller or shaft 57 in a parallel spaced relation with the drive shaft 31. A plurality of V-belts 58 are trained about the roller 57 and about the drive shaft 31 between the continuous belts 42 of the belt unit 32. The belts 58 are maintained in an axially spaced relation on the roller 57 by guide fingers 59 arranged at opposite sides of each belt 58 and supported on a transverse member 61 secured to the arms 54 and extended between the upper and lower runs of the belts 58. Tension of the belts 58 is controlled by adjustment of the front arm extensions 56.

The rear ends of the arms 54 are rotatably mounted on the drive shaft 31. Upward pivotal movement of the arms 54 is resisted by the action of a coil spring 63 (FIGS. 1 and 4) arranged in tension between an arm 54 and a bracket 64 secured to a corresponding side frame 44 at a position below the drive shaft 31. A rearward extension 66 on an arm 54 has a depending rod 67 pivotally supported from its free or rear end, the lower end of which projects loosely through a horizontal stop member 68 on the bracket 64. The underside of the stop is engageable by a nut 69 threadable on the rod 67 to limit the downward pivotal movement of the arms 54.

In use the machine 15 is quickly attached in a push relation with a tractor 16 at the hitch connection 26.

Figures 6, 10:
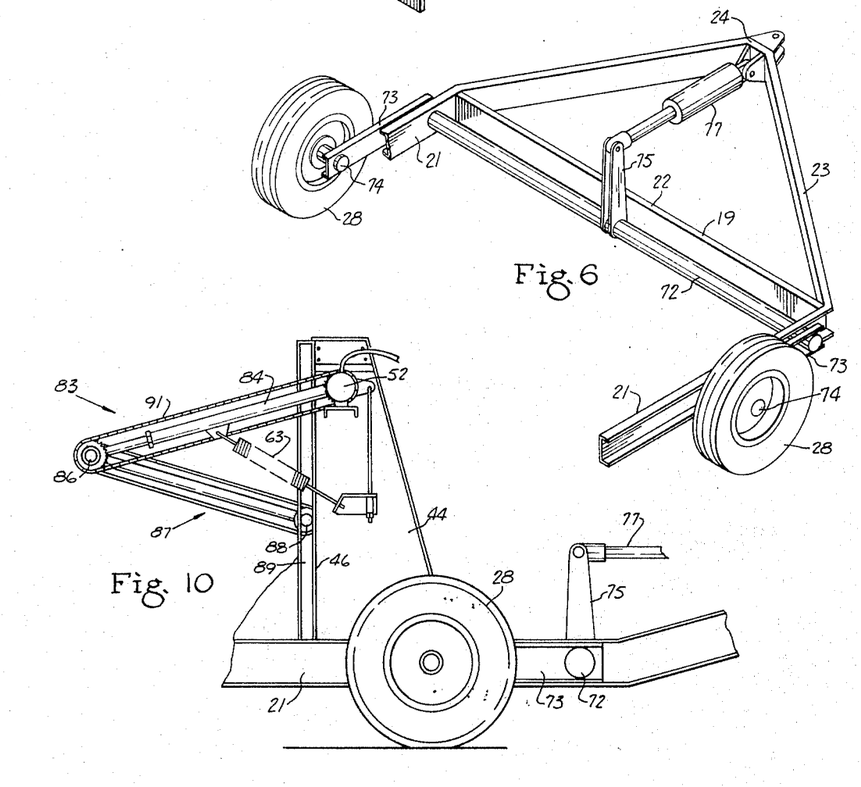
FIG. 6 is a perspective view of a mechanism for vertically adjusting the combination unit relative to the ground surface.
FIG. 10 is a side elevational view of a modified form of a bale compacting structure.
Figure 7:
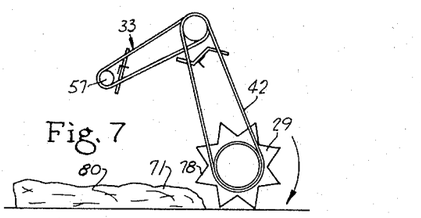
FIGS. 7, 8 and 9 are diagrammatic views illustrating in sequence the forming of a bale.

The combination unit 29 is adjusted in a ground clearing relation corresponding to the characteristics of the windrowed material, indicated at 71 in FIG. 7, to be formed into round bales. In this adjustment (FIG. 6) the main frame 19 is moved up and down relative to the ground wheels 28 by means including a rock shaft 72 extended between and rotatably supported on the side frame members 21 adjacent to the base section 22. A pair of rock arms 73 corresponding to and positioned outwardly from a side member 21 project forwardly from the shaft 72. The front end of each rock arm 73 carries a stub axle 74 for rotatably supporting an associated ground wheel 28. The rock shaft 72 is oscillated by a hydraulic cylinder assembly 77 pivotally interconnected with the apex section 24 of the bumper 23 and an upwardly projected rock arm 75 carried centrally of the rock shaft 72.

The combination unit 29 is then rotated by the hydraulic motor 52 and the baling machine 15 is advanced along the windrow 71 of fibrous material. In this respect the peripheral speed of rotation of the unit 29 is about the same as the linear speed of forward advance of the machine to provide for the material in a windrow being lifted and then rolled upon itself in much the same manner as the rolling of a rug. The lift action of the unit 29 is complemented by the forward runs of the belts 42 which also function to impart a rolling movement to the material.

Where the peripheral speed of the combination unit 29 appreciably exceeds the linear speed of travel of the machine 15, the fibrous material, such as hay or straw, is merely continuously swept in a direction forwardly of the combination unit in a manner similar to the forward throwing of dirt by the rotatable brush of a street sweeping machine. On the other hand should the peripheral speed of rotation of the unit 29 be appreciably less than the linear rate of travel of the machine, the material just tends to pile forwardly of the combination unit so as to be merely pushed in a forward direction rather than rolled.

Figure 8:
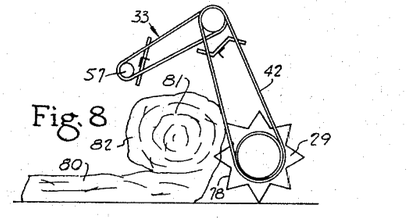
Figure 9:
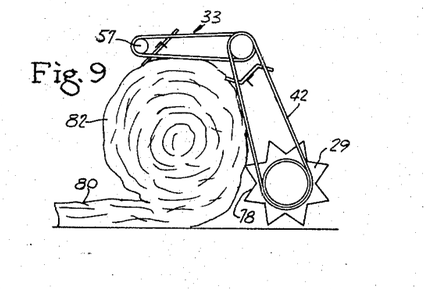

Thus, as shown in FIG. 7, the material 80 in the windrow 71 is initially lifted by the lift members 41, each of which has a leading edge or side 78 that extends substantially tangentially of the tubular body member 34. Such side 78, as it travels upwardly and forwardly into the material 80 initially engages and lifts the material and then releases the material for rolling to form a bale, as shown in FIG. 8. As the bale size increases the lift fingers 41 function not only to gather the material 80 for rolling forwardly of the combination unit 29 but additionally function as a driving sprocket to assist the belts 42 in rolling the bale along the ground or, more particularly, on the upper surface of the windrow 71.

Since the machine 15 is located forwardly of the tractor, the baling operation may be continuously observed by the tractor operator. Wrapping of the material to form the bale can thus be changed transversely of the machine over the length of the bale to maintain uniformity of the bale diameter by merely steering the machine from side to side of the windrow 71.

The ends of the bale are defined or limited by a pair of side plates 79 corresponding to the side frame members 21 and projected upwardly therefrom along the inner side of an adjacent side frame 44. As illustrated in FIG. 8, it is seen that the bale core, indicated as 81, is formed by being rolled by and forwardly of the combination unit 29 to a size wherein the peripheral surface thereof is engaged by the forward runs of the continuous belts 42 and the lower runs of the belts 58 of the belt structure 33. As previously described, the upward pivotal movement of the belt structure 33 takes place against the pressure of the springs 63. Because of this pressure the bale being formed is compressed against the belts 42 and the ground surface until it reaches a firmness or density sufficient to counteract the spring pressure. At such time the bale will continue to increase in size under the additional compacting pressure exerted by the coil springs 63.

It is seen, therefore, that in the forming of the core 81 the bale 82 is moved forwardly by the joint action of the combination unit 29 and belts 42 while being confined between the side plates 79. Then when the bale has increased to a size to be engaged by the belt structure 33 the rolling or forming of the bale about the core 81 takes place against the compressive pressure applied by the springs 63. In this respect, it is to be noted that the bale, while being confined between the side plates 79, is rolled forwardly along the ground surface by the complementary driving action of the combination unit 29, belt unit 32 and belt structure 33.

When the bale 82 (FIG. 8) has been formed to a desired size, the machine 15 is merely pushed to one side of the material windrow 71 so as to discontinue any further pickup of material from the windrow. During a continued advance of the machine, free of the windrow, the bale 82 may be tied through a suitable twine mechanism (not shown) providing for the wrapping of twine about and axially of the bale as the bale is rolled along the ground. On completion of this twining operation, it is only necessary to back the baling machine 15 free of the completed bale 82 and then start another baling operation at the point in the material windrow 71 at which the previous baling operation was terminated.

With reference to FIG. 10, there is illustrated a modified form of the baling machine 15 which is similar in all respects to the machine described in connection with FIGS. 1-9, inclusive, except for the substitution of the bale compacting belt structure 83 for the belt structure 33. The modified belt structure 83 is comprised of a pair of transversely spaced arms 84 having rear ends pivotally supported on the drive shaft 31 and front ends pivotally interconnected at 86 to a transversely extended belt unit 87 to form a composite articulated belt assembly. The rear end of the belt unit 87 is slidably supported on the side frames 44 for vertical up and down movement. For this purpose a roller 88 at the rear end of the belt unit 87 is movable within guideways 89 formed between the front legs 46 of the side frames 44 and coacting upright guide members spaced forwardly of the front legs 46. The belt unit 87 is operated by means of a chain and sprocket assembly 91 connected between the drive shaft 31 and the drive shaft 86 which constitutes the pivot for interconnecting the belt structure 83 and belt unit 87.

In the forming of a bale, upward movement of the belt unit 87 is yieldably resisted by the action of the coil springs 63 which are operatively associated with arms 84 in all respects the same as their association with the arms 54. By virtue of the belt unit 87 being extended upwardly and forwardly from a position adjacent the combination unit 29 it is apparent that the compacting action on a bale to be formed will also take place on the bale core 81.

A further modification of the invention is shown in FIGS. 11-20, inclusive, wherein the lifting and rolling unit 29a is driven from the ground wheels 28a and a series of three curved arm assemblies 92, 93 and 94 (FIGS. 12 and 18) are relatively arranged so as to sequentially engage a bale 82 as it is being formed. This modified machine, designated generally as 15a, includes a portable frame 96 (FIG. 11) that has a pair of transversely spaced upright side plates 97 connected across their rear ends by a transverse connecting tubular member 98 of a generally rectangular shape in transverse cross section. The connector member 98 is positioned horizontally intermediate the upper and lower ends 99 and 101, respectively, of the side plates 97. A brace member or gusset 102 extends laterally outwardly from the rear edge of each side plate 97 between the connector member 98 and the upper end 99 of a side plate. A flat horizontal brace member 103 on a side plate 97 projects forwardly from the connector member 98 over the full length of a side plate.

Spaced below the tubular connector member 98 (FIGS. 11 and 15) and in a parallel relation therewith is a transverse rock shaft 104, the ends of which project outwardly from the rear portions of the lower ends 101 of the side plates 97. The projected ends of the shaft 104 are rockably mounted in end ring bearings 106, each of which is secured to a corresponding side plate 97 and an associated upright flat brace member 107 that extends between an end ring bearing 106 and the tubular connector member 98. Center ring bearings 108 for the rock shaft 104 are carried at the lower ends of a pair of transversely spaced upright arms 109 secured to and projected downwardly from the tubular connector member 98. A rock arm 111 extends forwardly from each end of the rock shaft 104 to the outside of an adjacent side plate 97. Each rock arm 111 is provided at its front end with a ground wheel 28a, which is located between a side plate 97 and a corresponding rock arm 111.

In order to drive the combination lifting and rolling unit 29a from the ground wheels 28a there is provided a frictionally driven wheel 112 (FIG. 11) corresponding to each ground wheel 28a. A wheel 112 is mounted on each stub axle 37a of the unit 29a in the vertical plane of an associated ground wheel 28a so as to be located between a side plate 97 and adjacent rock arm 111 with the axis thereof (FIGS. 13 and 14) positioned above a plane common to the axes of the rock shaft 104 and ground wheels 28a. Each stub axle 37a extends through and is rotatably supported on an adjacent side plate 97 so that the cylindrical body member 34 and pickup members 41 of the combination unit 29a are located between the side plates 97. It is to be understood that except for the extension of the stub axles 37a to accommodate the frictionally driven wheels 112, the combination unit 29a is similar in all respects to the combination unit 29 described in connection with the machine in FIG. 1.

The ground wheels 28a and the frictionally driven wheels 112 are equipped with rubber automobile tires of inflatable type. On relative movement between the ground wheels 28a and the frame 96, in response to a rocking action of the rock shaft 104, the peripheral surfaces of the wheels 112 are moved into and out of frictional engagement with the peripheral surfaces of the ground wheels 28a. Thus, on upward movement of the machine frame 96 the friction wheels 112 are moved into a neutral position relative to the ground wheels 28a so that the combination unit 29a is in an elevated inoperative or transport position shown in FIG. 14. With a lowering of the frame 96, the friction wheels 112 are moved into a frictionally engaged or driven position with the ground wheels 28a (FIG. 13) concurrently with a downward movement of the combination unit 29a into a working or operating position.

Figure 15:
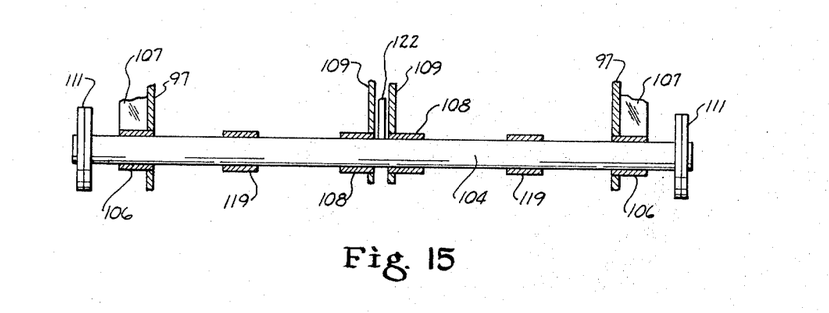
FIG. 15 is an enlarged detail sectional view taken on line 15—15 in FIG. 11.

The rock shaft 104 is actuated by a hydraulic cylinder assembly 113 (FIG. 11) that is carried on a tongue structure 114. The tongue structure extends rearwardly from the machine frame 96 and has a rear hitch connection 116 attachable to the front end of the tractor 16 to provide for a pushing of the machine 15a in all ways similar to the machine 15 of FIG. 1. The tongue structure 114 includes an upper pair of forwardly diverging arms 117 the front ends of which are secured to the underside of the tubular connector member 98 at a position between the side plates 97. The front ends of a lower pair of forwardly diverging arms 118 carry ring members 119 for rotatably receiving the rock shaft 104. The cylinder assembly 113 has one end pivotally connected to a brace member 121 interconnected between the lower arms 118 and an opposite end pivoted to the free end of a rock arm 122 projected radially from the rock shaft 104 at a position between the rock shaft center bearings 108 (FIGS. 11 and 15).

Figure 13:
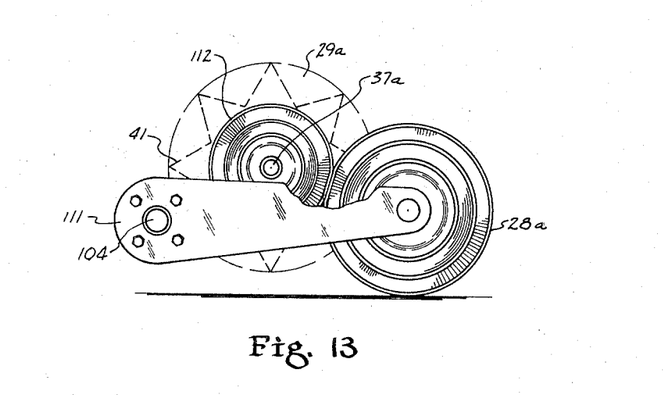
FIGS. 13 and 14 are diagrammatic views showing, respectively, the operating and transport positions of the machine of FIG. 11.
Figure 14:
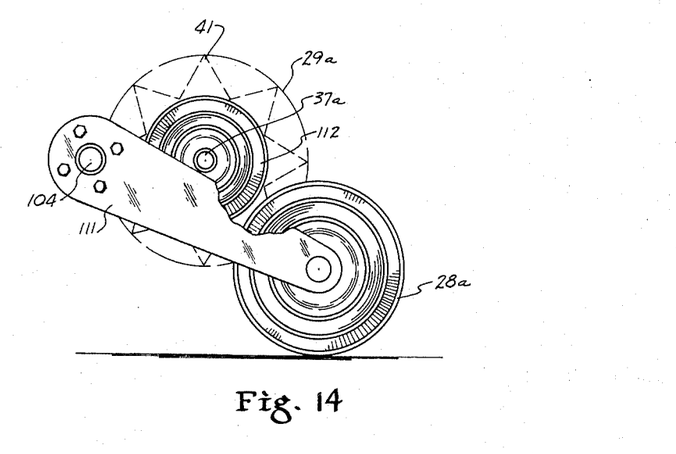

With wheel 28a resting on the ground surface, on retraction of the cylinder assembly 113, to move a friction wheel 112 from its neutral position in FIG. 14 to the engaged position therefor in FIG. 13, it will be seen that a ground wheel 28a is moved in a forward direction concurrently with a rearward movement of the friction wheel 112. This relative reverse movement of the wheels 112 and 28a takes place in response to the lowering of the rock shaft 104 concurrently with the vertical pivotal movement of the tongue structure 114 about the hitch connection 116. It is seen, therefore, that the friction wheels 112 are in proximity to the ground wheels 28a at all moved positions of the combination unit 29a. Adjustment of the unit 29a relative to the ground surface to a desired operating position is thus accomplished while maintaining an efficient frictional engagement between the wheels 28a and 112.

Figure 11:
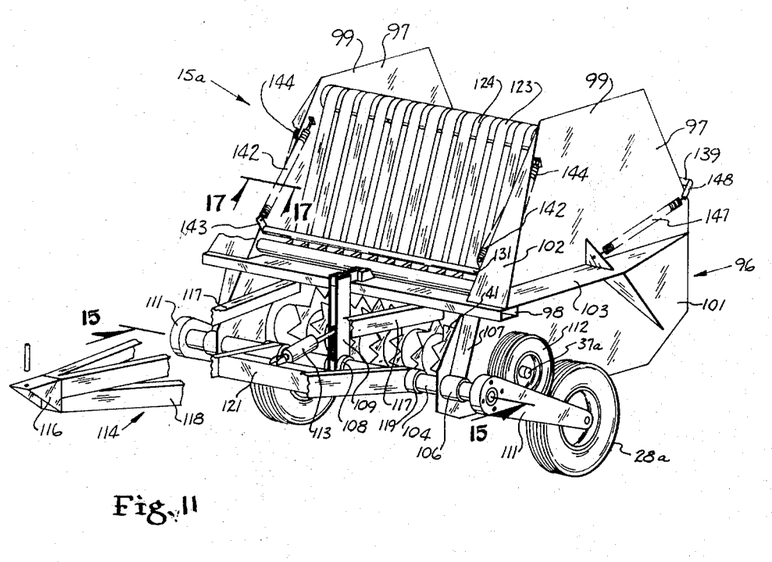
FIG. 11 is a rear perspective view of a modified form of a baling machine.
Figure 12:
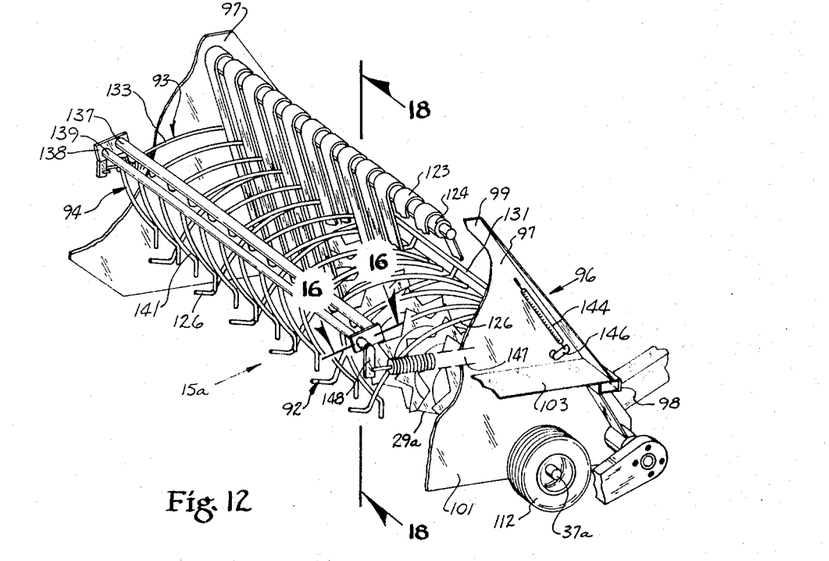
FIG. 12 is an enlarged front perspective view of the bale compacting means for the machine shown in FIG. 11.

The combination unit 29a carries a series of endless belts 123 between the rows of lift members 41 (FIG. 11). The upper ends of the endless belts 123 (FIG. 18) are trained about a roller 124 that is rotatably carried in the side plates 97 between the rear portions of the upper ends 101. The axis of the roller 124 is in a parallel relation with and located forwardly of the axis for the combination unit 29a, similarly to the arrangement of the corresponding parts described in connection with FIG. 1. In the forming of the bale 82, therefore, the front runs of the belts 123 cooperate initially with the lower arm assembly 92 which includes a series of forwardly extended transversely spaced arm members 126 (FIG. 12). Each of the arm members 126 (FIG. 18) has an upright linear rear section 127 and a downwardly facing front curved section 128 terminating in an upward turned portion 129. The rear ends of the arm members 126 (FIGS. 11 and 18) are secured to a common rock shaft 131 rotatably supported on the side plates 97 rearwardly of the rear lengths or runs of the endless belts 123. The arm members 126 extend forwardly between selected adjacent ones of the belts 123 with the front sections 128 thereof having a length such that their junctions 132 with the rear sections 127 are located rearwardly of the front run of the endless belts 123.

The upper arm assembly 93 is spaced upwardly and above the lower arm assembly 92 and is illustrated as including a series of transversely spaced arm members 133, each of which is upwardly bowed or curved and of a greater length than the arm members 126. Thus, as best appears in FIG. 18, it is seen that the arm members 133 extend over substantially the full length of the side plates 97 with the arm members 126 being about three-fourths as long as the arm members 133.

The rear ends of the arm members 133 are secured to a common rock shaft 134 carried by the side plates 97 in a parallel relation with and below the rock shaft 131. Similarly to the arm members 126, the arm members 133 are extended forwardly between selected adjacent ones of the endless belts 123.

The third or front arm assembly 94 functions as a foldable forward extension relative to the arm members 133 of the upper arm assembly 93. Thus, referring to FIGS. 12 and 18, it is seen that the front ends of the arm members 133 terminate in upturned portions 136 which are secured to a common tubular support member 137 that extends between the side plates 97. The opposite ends of the support member 137 carry forwardly projected side plates 138 (FIGS. 16 and 18) for rotatably supporting a rock shaft 139 in a parallel relation with the support member 137. Secured to the rock shaft 139 so as to normally suspend therefrom are a plurality of spaced arm members 141. The arms 141 are of a curved configuration with the concave sides thereof faced rearwardly.

The arm assembly 92 is continuously urged or biased in a downward direction by a pair of coil springs 142 (FIGS. 11 and 17) each of which is located to the inside of a side plate 97 and interconnected to a side plate 97 and a rock arm 143 on the rock shaft 131. The arm assembly 93 is similarly continuously urged in a downward direction by a pair of coil springs 144 located outwardly of the side plates 97 and interconnected to a corresponding side plate and a rock arm 146 on the rock shaft 134. The spring assembly 94 is continuously biased in a rearward direction by a pair of coil springs 147 (FIGS. 11 and 12) arranged to the outside of the side plates 97 and connected to a side plate and a rock arm 148 on the rock shaft 139. The biased positions of the arm assemblies 92, 93 and 94 are defined by suitable stop means (not shown) engageable with the rock arms 143, 146 and 148.

Figures 16, 17, 18, 19, 20:
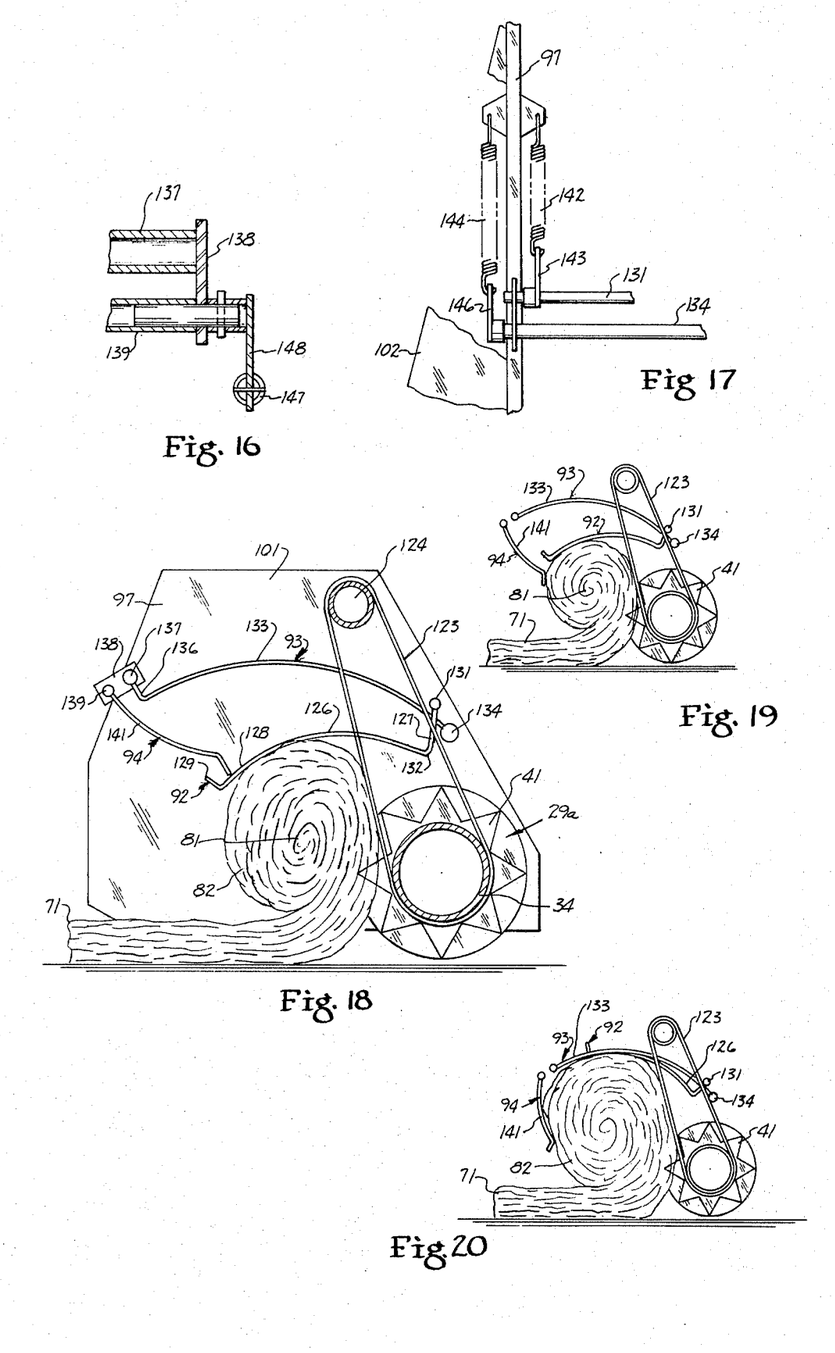
FIG. 16 is an enlarged detail sectional view as seen on line 16—16 in FIG. 12.
FIG. 17 is an enlarged detail sectional view on line 17—17 in FIG. 12.
FIG. 18 is a transverse sectional view of the machine taken along line 18—18 in FIG. 12.
FIGS. 19 and 20 are diagrammatic views showing in sequence the forming of a bale by the machine of FIG. 11.

In the operation of the machine 15a the windrowed material 71 is lifted and rolled by the members 41 for initial compaction between the lower arm assembly 92 and the front runs of the endless belts 123, as illustrated in FIG. 18. As the bale core 81 increases in size (FIG. 19) the forward side thereof is next engaged by the terminal lower ends of the arm members 141. On a continued increase in the size of the bale 82 (FIG. 20) the arms 126 are moved to positions between certain of the arm members 133 at about the time the front arms 141 are in full engagement with the front portion of the bale.

It is seen, therefore, that the arm assemblies 92, 93 and 94 are sequentially engageable with the bale 82 being formed to provide for a compaction of the bale about the greater portion of its peripheral surface progressively with the increase in size of the bale. In this respect, it is to be noted that the front runs of the endless belts 123 cooperate at all times with the arm assemblies 92, 93 and 94 in such compaction. As best appears in FIG. 18, it will be noted that the extension of the curved front sections 128 of the arm members 126 from a position rearwardly of the front runs of the endless belts 123 provides what might be termed a top wall for a baling zone that confines and directs downwardly the windrowed material 71 being baled. Without the downwardly directing action provided by the curved front sections 128, the material 71 elevated by the lift members 41 tends to follow the belts 123 so as to initially form a bale core 81 of an oval shape in transverse cross section. It is apparent, of course, that unless the material is rolled into a cylindrical form the compacting action of the arm assemblies 92, 93 and 94 is appreciably impaired so as to result in what might be termed a soft bale having inadequate storage and weather resisting characteristics.

Although the invention has been described with respect to preferred embodiments thereof, it is to be understood that it is not to be so limited since changes and modifications can be made therein which are within the full intended scope of this invention as defined by the appended claims.

I claim:

1. A machine for forming a round bale of windrowed fibrous material comprising:
   a. a portable frame including transversely spaced side members,
   b. a rotatable combination material lifting and rolling unit including a cylindrical body member extended between and rotatably supported on said side members,
   c. material lift members secured to and projected radially from the peripheral surface of said body member, for rotation as a unit with said body member,
   d. means for rotating said combination unit in a direction counter to the forward advance of travel of said portable frame at a peripheral speed equal substantially to the speed of forward travel of said portable frame, whereby said lift members initially engage and lift the windrowed material and then release the material for rolling on the ground surface in said direction of travel and between said side members to form a round bale forwardly of said combination unit; and
   e. means on said frame for yieldably engaging certain peripheral portions of the bale being formed to compact the material in the bale including upwardly and forwardly extended continuous flexible members having lower portions trained about said body member.

2. A machine for forming a round bale according to claim 1 wherein:
   a. said yieldable engaging means includes a transverse shaft rotatably mounted on said portable frame upwardly and forwardly of said combination unit, and said flexible members being continuous belts having upper portions trained about said shaft,
   b. a pair of arms at opposite sides of said portable frame projected forwardly of said shaft,
   c. means pivotally supporting the rear ends of said arms on said shaft for pivotal up and down movement of the front ends thereof about the axis of said shaft,
   d. means limiting the downward pivotal movement of said arms, and
   e. a plurality of bale engaging members supported on and extended longitudinally of said arms in a spaced relation transversely of said portable frame.

3. A machine for forming a round bale according to claim 1 including:
   a. means on said frame for vertically adjusting said combination unit relative to the ground surface.

4. A machine for forming a round bale according to claim 1 including:
   a. a transverse shaft rotatably mounted on said portable frame upwardly and forwardly of said combination unit,
   b. a pair of forwardly projected arms at opposite sides of said frame pivotally supported on said shaft for up and down pivotal movement of the front ends thereof about the axis of said shaft,
   c. a belt assembly including a pair of side members corresponding to said arms members having rear ends guidably supported on said portable frame for vertical up and down movement forwardly of said flexible members which comprise continuous belts,
   d. a second shaft parallel to said first shaft pivotally interconnecting the front ends of said arms and the front ends of said side members,
   e. a third shaft extended between and mounted on the rear ends of said side members,
   f. a series of transversely spaced belts trained about said second and third shafts, and
   g. means for driving said third shaft from said second shaft.

5. A machine for forming a round bale in accordance with claim 1 wherein:
   a. said combination unit includes a shaft member having the ends thereof rotatably supported on and projected laterally outwardly from said side members,
   b. a pair of transversely opposite ground wheels supported on said frame for relative up and down adjustment,
   c. a pair of friction wheels corresponding to said ground wheels and mounted on corresponding ends of said combination unit shaft, and
   d. means for adjustably moving said frame relative to said ground wheels to a first operating position wherein corresponding ones of said ground wheels and friction wheels have peripheral portions thereof in frictional engagement to provide for the rotation of said combination unit in response to a forward advance of said portable frame, and to a second position wherein said peripheral portions are disengaged.

6. A machine for forming a round bale in accordance with claim 1 wherein:
   a. said yieldable means and the ground surface between said side members forwardly of the combination unit define a bale forming zone.

7. A machine for forming a round bale according to claim 1 wherein:

a. said lift members are arranged in circumferential rows spaced axially of said body member, and b. the lower portions of said flexible members which consist of continuous belts are positioned between said circumferential rows of lift members.

8. A machine for forming a round bale according to claim 2 including:

a. a roller extended between and rotatably supported on the front ends of said arms, and b. said bale engaging members comprise continuous belts trained about said shaft and roller.

9. A machine for forming a round bale according to claim 7 wherein:

a. each of said lift members has a leading side which lies in a plane substantially tangent to said body member and movable, on rotation of the material lifting and rolling unit, to a horizontal position projected forwardly from the upper side of said body member.

10. A machine for forming a round bale according to claim 7 wherein:

a. said body member is not less than about a foot in diameter and each lift member is of a length equal substantially to the radius of said body member.

11. A machine for forming a round bale according to claim 7 wherein:

a. said yieldable means additionally includes a pair of arm assemblies, b. a pair of parallel transverse rock shafts corresponding to said arm assemblies rotatably mounted in a vertically spaced relation on said frame rearwardly of said continuous belts, c. each of said arm assemblies including arm members spaced transversely of a corresponding rock shaft and projected forwardly of the lifting and rolling unit between certain adjacent ones of said continuous belts, d. each of said arm members having a front section of a curved shape with the concave side thereof faced downwardly and with the front sections of the arm members of the upper one of said arm assemblies of a longer length than the front sections of the arm members of the lower one of said arm assemblies, and e. means for yieldably urging said arm assemblies in a downward direction, f. with the lower arm assembly initially engageable with a bale being formed and the arm members thereof movable to positions between the arm members of the upper arm assembly.

12. A machine for forming a round bale according to claim 9 wherein:

a. each lift member is of an isosceles triangular shape in side elevation with said leading side constituting one side thereof.

13. A machine for forming a round bale according to claim 11, wherein:

a. the front curved sections of the arm members of the lower arm assembly extend rearwardly to a position located rearwardly of the forward runs of said continuous belts so that material moved upwardly by said continuous belts and combination unit is directed against said curved sections of the arm members of said lower arm assembly.

14. A machine for forming a round bale according to claim 11 including:

a. a third arm assembly including a transverse rock shaft mounted at the front ends of the curved sections of the arm members of the upper arm assembly, b. curved arm members secured at one of the ends thereof to said last mentioned rock shaft and extended downwardly from said secured ends, and c. means yieldably urging said third arm assembly in a direction toward said continuous belts, d. said pair of arm assemblies and said third arm assembly cooperating in response to the enlargement of a bale being formed to successively engage selected peripheral portions of the bale.

15. A machine for forming a round bale according to claim 11 including:

a. means on said frame for limiting the downward movement of said pair of arm assemblies.

16. A machine for forming a round bale of windrowed fibrous material comprising:

a. a portable frame including a pair of longitudinally extended transversely spaced side members and a pair of transversely opposite upright frames mounted on and corresponding to said side members, b. a rotatable combination material lifting and rolling unit extended between and rotatably supported on said side members, c. a first rotatable shaft extended between and rotatably supported on said upright frames adjacent the upper ends thereof at a position forwardly of said combination unit, d. a second rotatable shaft, e. a pair of transversely spaced arms having rear ends pivotally supported on said upright frames and front ends located forwardly of said first shaft, f. means rotatably supporting said second shaft at the front ends of said arms in a parallel relation with said first shaft, g. a first plurality of belts spaced transversely of said portable frame and trained about said combination unit and said first shaft, h. a second plurality of belts spaced transversely of said portable frame and trained about said first shaft and second shaft, i. means for rotating said combination unit in a direction counter to the direction of travel of said frame at a peripheral speed substantially equal to the linear speed of travel of said portable frame, and j. means for rotating said second plurality of belts such that the lower runs thereof move in the direction of travel of said portable frame.

* * * * *